(12) United States Patent
Oh et al.

(10) Patent No.: US 12,199,427 B2
(45) Date of Patent: Jan. 14, 2025

(54) DISTRIBUTION NETWORK MANAGEMENT SYSTEM USING DISTRIBUTED CONTROL

(71) Applicant: Korea Institute of Energy Research, Daejeon (KR)

(72) Inventors: Sea Seung Oh, Daejeon (KR); Su-Yong Chae, Daejeon (KR); Suk In Park, Daejeon (KR); Gyu Duk Kim, Daejeon (KR); Seung Weon Yu, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 589 days.

(21) Appl. No.: 17/512,995

(22) Filed: Oct. 28, 2021

(65) Prior Publication Data
US 2022/0200280 A1    Jun. 23, 2022

(30) Foreign Application Priority Data

Dec. 22, 2020   (KR) .................. 10-2020-0181196

(51) Int. Cl.
*H02J 3/00*    (2006.01)
*H02J 3/14*    (2006.01)

(52) U.S. Cl.
CPC .......... *H02J 3/004* (2020.01); *H02J 3/00125* (2020.01); *H02J 3/14* (2013.01); *H02J 2300/24* (2020.01); *Y04S 10/12* (2013.01)

(58) Field of Classification Search
USPC ..................................................... 700/291
See application file for complete search history.

(56) References Cited

U.S. PATENT DOCUMENTS

| 10,886,971 B1* | 1/2021 | Pleiter | .................... H04B 3/56 |
| 2009/0187285 A1* | 7/2009 | Yaney | ............... H02J 13/00024 |
| | | | 700/292 |

(Continued)

FOREIGN PATENT DOCUMENTS

| KR | 10-2014-0048395 A | 4/2014 |
| KR | 10-1545060 B1 | 8/2015 |

(Continued)

*Primary Examiner* — Emilio J Saavedra
(74) *Attorney, Agent, or Firm* — Birch, Stewart, Kolasch & Birch, LLP

(57) ABSTRACT

A distribution network management system includes a power generation device including a renewable energy power generation source, and is connected to a distribution network through a first node; a first distributed device including a first distributed resource, connected to the distribution network through a second node, and configured to receive first node information and power generation information from the power generation device and attempt to control the first distributed resource so that an overvoltage for the first node is resolved; and a second distributed device including a second distributed resource, connected to the distribution network through a third node which is located farther away from the first node than the second node, and configured to, when the first node information and the power generation information are received from the first distributed device, attempt to control the second distributed resource so that the overvoltage for the first node is resolved.

7 Claims, 5 Drawing Sheets

(56) References Cited

U.S. PATENT DOCUMENTS

| | | | | |
|---|---|---|---|---|
| 2013/0173331 A1* | 7/2013 | Mohagheghi | ............ | H02J 5/00 |
| | | | | 705/7.25 |
| 2015/0148975 A1 | 5/2015 | Jeong et al. | | |
| 2016/0079752 A1 | 3/2016 | Matan et al. | | |
| 2016/0141879 A1* | 5/2016 | Motsenbocker | .......... | G05F 1/67 |
| | | | | 307/130 |

FOREIGN PATENT DOCUMENTS

| | | | |
|---|---|---|---|
| KR | 10-2019-0040543 A | | 4/2019 |
| KR | 10-2019255 B1 | | 9/2019 |
| KR | 10-2019-0118436 A | | 10/2019 |
| KR | 20190118436 A | * | 10/2019 |
| KR | 10-2020-0124977 A | | 11/2020 |

\* cited by examiner

DISTRIBUTION NETWORK MANAGEMENT SYSTEM USING DISTRIBUTED CONTROL

CROSS REFERENCE TO RELATED APPLICATION

This application claims priority from Republic of Korea Patent Application No. 10-2020-0181196, filed on Dec. 22, 2020, which is hereby incorporated by reference in its entirety.

BACKGROUND

1. Field of Technology

The present disclosure relates to a distribution network management technology using distributed control.

2. Description of the Prior Art

As the problem of depletion of fossil fuels and the problem of warming due to greenhouse gases are emerging, power generation devices which generate electricity using renewable energy sources are increasing. Solar power generators and wind power generators are representative power generation devices which use renewable energy sources to generate electricity.

These power generation devices do not use fossil fuels and mainly convert energy existing in nature into electric energy, so the amounts of power generation are unpredictable. Due to these unpredictable characteristics, a power generation device including a renewable energy source serves as a factor that disturbs the power of a distribution network connected thereto. When the number of power generation devices including renewable energy sources is small compared to the power capacity of a grid, such disturbance is not a big problem. However, when the number of such power generation devices increases as in recent times, it needs to consider the issue of power quality in a grid.

On the other hand, power generation devices using renewable energy sources are often installed in an area away from an area where loads are concentrated, due to the characteristics of the energy sources. For example, solar power generation devices and wind power generation devices are mainly installed in areas away from downtown areas, such as mountains or beaches.

When viewed based on a location on a distribution network, power generation devices using renewable energy sources are mainly connected to distribution terminals. Since not many loads are connected to the distribution terminals and there are distances from substations, the power states of the distribution terminals are often determined according to the outputs of such power generation devices. However, since power generation devices including renewable energy sources are unpredictable in their power generation amounts as described above, when the power generation amounts increase at any moment, the voltages of distribution terminals change to an overvoltage state, and the power quality of the distribution terminals may be deteriorated.

In order to cope with this problem, when the distribution terminals become an overvoltage state, operators who manage the distribution network demand to limit the power generation amounts of the power generation devices including the renewable energy sources, but there arises a problem in that such a demand conflicts with the needs of society as a whole to increase the use of the renewable energy sources.

SUMMARY OF THE INVENTION

Under such a background, in one aspect, various embodiments are directed to providing a technology for resolving an overvoltage state of a distribution terminal by a power generation device including a renewable energy source. In another aspect, various embodiments are directed to providing a technology for maintaining the power quality of a distribution terminal without limiting the power generation amount of a power generation device including a renewable energy source. In still another aspect, various embodiments are directed to providing a technology capable of autonomously maintaining power quality at a distribution terminal through distributed control rather than central control.

To this end, in an aspect, the present disclosure provides a distribution network management system comprising: a power generation device including a renewable energy power generation source and connected to a distribution network through a first node; a first distributed device including a first distributed resource, connected to the distribution network through a second node, and configured to receive first node information and power generation information from the power generation device and to attempt to control the first distributed resource in a direction in which an overvoltage for the first node is resolved; and a second distributed device including a second distributed resource, connected to the distribution network through a third node which is located farther away from the first node than the second node, and configured to, when the first node information and the power generation information are received from the first distributed device, attempt to control the second distributed resource in a direction in which the overvoltage for the first node is resolved.

The first distributed device may determine, through the first node information, whether the overvoltage has occurred at the first node, and when it is determined through the power generation information that the overvoltage is caused by the power generation device, attempt to control the first distributed resource in a direction in which the overvoltage for the first node is resolved.

When it is predicted through the first node information and the power generation information that the overvoltage will occur at the first node within a predetermined time, the first distributed device may attempt to control the first distributed resource in a direction in which the overvoltage for the first node is resolved.

A reaction time of the first distributed resource for a control command of the first distributed device may be shorter than the predetermined time.

The first distributed device may transfer, to the first distributed resource, a voltage control command for the second node.

If the first distributed resource reaches the limit in control when attempting to control the first distributed resource, the first distributed device may transmit the first node information and the power generation information to the second distributed device.

The renewable energy power generation source may be a solar power generation source, the first distributed resource may be an energy storage system (ESS) resource, and the second distributed resource may be a load resource.

The distribution network management system may comprise N (N is a natural number equal to or greater than 2) distributed devices including the first distributed device and the second distributed device. When arranging the distributed devices in an ascending order of distances to the first node on the basis of connection locations to the distribution network, in a case of not being the first or the last, each distributed device may communicate only with distributed devices right before and right after each distributed device.

When an ith (i is a natural number) distributed device reaches the limit in control, the ith distributed device may transmit the first node information and the power generation information to an (i+1)th distributed device.

When a last distributed device reaches the limit in control, the last distributed device may request the power generation device to limit a power generation amount.

As is apparent from the above, according to the embodiments, it is possible to resolve the overvoltage state of a distribution terminal by a power generation device including a renewable energy source. Further, according to the embodiments, it is possible to maintain the power quality of the distribution terminal without limiting the power generation amount of the power generation device including the renewable energy source. Also, according to the embodiments, it is possible to autonomously maintain power quality at the distribution terminal through distributed control rather than central control.

DETAILED DESCRIPTION OF THE EXEMPLARY EMBODIMENTS

Figure 1:
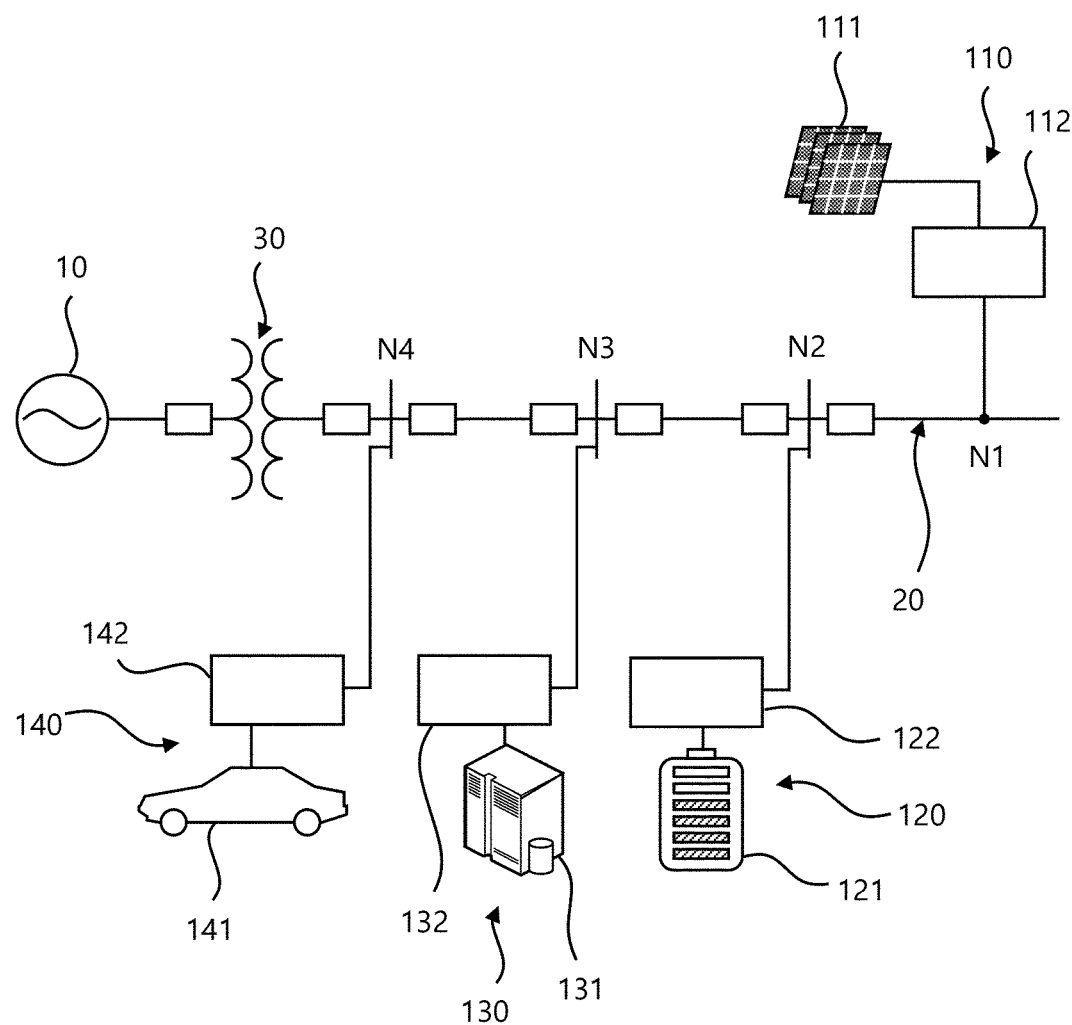
FIG. 1 is a configuration diagram of a distribution network system in accordance with an embodiment.

Hereinafter, embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected." "coupled," and "joined" between the first and second components.

FIG. 1 is a configuration diagram of a distribution network system in accordance with an embodiment.

Referring to FIG. 1, the distribution network system may include a grid 10, a substation 30 and a distribution network 20. The distribution network system may further include a power generation device 110 and distributed devices 120, 130 and 140 which are connected to the distribution network 20.

The power generation device 110 and the distributed devices 120, 130 and 140 may configure a distribution network management system in accordance with an embodiment.

The grid 10 is called a macrogrid, a plurality of power sources may be connected to the grid 10, and the properties of power such as voltage, frequency, etc. may be stably maintained according to the balance between supply and demand.

The distribution network 20 may be connected to the grid 10 through the substation 30, and a transformer included in the substation 30 may supply the power of the grid 10 to the distribution network 20.

A plurality of nodes N1 to N4 may be formed on the distribution network 20, and a power generation source or loads may be connected to the respective nodes N1 to N4. In the description of the embodiment, the power generation device 110 is connected to a first node N1, a first distributed device 120 is connected to a second node N2, a second distributed device 130 is connected to a third node N3, and a third distributed device 140 is connected to a fourth node N4. Although not illustrated in the drawing, a plurality of other power generation sources or loads may be connected to the distribution network 20. Furthermore, a plurality of distributed devices including a fourth distributed device may be additionally connected.

Among the resources 110, 120, 130 and 140 configuring the distribution network management system, the power generation device 110 may be connected to the node N1 which is farthest from the substation 30 and is closest to a distribution terminal.

The power generation device 110 may include a renewable energy power generation source 111. Due to social awareness or environmental factors for the renewable energy power generation source 111, the power generation device 110 may be connected to the node N1 which is closest to the distribution terminal.

The power generation amount of the renewable energy power source 11 included in the power generation device 110 may be unpredictable. The renewable energy power generation source 111 may be, for example, a solar power generation source or a wind power generation source, and the power generation amount of such a power generation source has an unpredictable characteristic.

Due to the unpredictable characteristic of the power generation amount, the power generation device 110 may supply power more than demand to the first node N1. According to such excessive power supply, the voltage of the first node N1 may rise, and may exceed an upper limit voltage specified in a grid management rule to reach an overvoltage state.

The power generation device 110 may include a power generation controller 112. In order to resolve or prevent such an overvoltage state of the first node N1, the power generation controller 112 may transmit first node information and power generation information to the first distributed device 120.

The first node information as information on the state of the first node N1 may include information on the voltage of the first node N1 and whether the first node N1 is in the overvoltage state. The power generation information may include information on the power generation amount of the power generation device 110 or a power transmission amount to the first node N1.

The power generation controller 112 as a device for controlling and managing the renewable energy power generation source 111 may perform MPPT (maximum power point tracking) control for the renewable energy power generation source 111, may perform control such as limiting a power generation amount, stopping power generation, blocking power transmission interruption, etc. The power generation controller 112 may additionally perform a function according to the embodiment while basically performing such control and management.

The power generation controller 112 may exchange information with at least one distributed device while being connected to a communication network. The power generation controller 112 according to the embodiment may transmit the first node information and the power generation information to only the first distributed device 120.

The first distributed device 120, the second distributed device 130 and the third distributed device 140 which configure the distribution network management system are defined according to order in which an electrical distance from a node connected thereto to the first node N1 is short. Speaking in a more generalized manner, there may be N (N is a natural number equal to or greater than 2) number of distributed devices configuring a distribution network management system. When arranging the distributed devices in ascending order according to a distance to the first node N1 on the basis of a connection location to a distribution network, a first distributed device may be referred to as a first distributed device, and an Nth distributed device may be referred to as an Nth distributed device.

The distributed devices 120, 130 and 140 may include distributed resources 121, 131 and 141 and distributed controllers 122, 132 and 142. Hereinafter, a distributed resource included in the first distributed device 120 will be referred to as a first distributed resource, and a distributed controller included in the first distributed device 120 will be referred to as a first distributed controller. Also, a distributed resource included in the Nth distributed device will be referred to as an Nth distributed resource, and a distributed controller included in the Nth distributed device will be referred to as an Nth distributed controller.

The distributed resources 121, 131 and 141 as resources which consume or store power may be controlled. The distributed resources 121, 131 and 141 may be, for example, controllable loads, and may be ESS (energy storage system) devices.

The distributed controllers 122, 132 and 142 may control the power consumption amounts or charge amounts of the distributed resources 121, 131 and 141 according to an internal need or a request from the outside.

The first distributed controller 122 included in the first distributed device 120 may receive the first node information and the power generation information from the power generation device 110, and when it is determined that an overvoltage has occurred in the first node N1 or it is predicted that an overvoltage will occur in the first node N1, may attempt to control the first distributed resource 121 in a direction in which the overvoltage of the first node N1 is resolved.

The second distributed controller 132 may receive the first node information and the power generation information from the first distributed controller 122, and when it is determined that an overvoltage has occurred in the first node N1 or it is predicted that an overvoltage will occur in the first node N1, may attempt to control the second distributed resource 131 in a direction in which the overvoltage of the first node N1 is resolved. The third distributed controller 142 may receive the first node information and the power generation information from the second distributed controller 132, and when it is determined that an overvoltage has occurred in the first node N1 or it is predicted that an overvoltage will occur in the first node N1, may attempt to control the third distributed resource 141 in a direction in which the overvoltage of the first node N1 is resolved.

Speaking to be generalized to the N number of distributed devices, the first distributed controller 122 may receive the first node information and the power generation information from the power generation device 110, and an (i+1)th (i is a natural number less than N) distributed controller may receive the first node information and the power generation information from an ith distributed controller. When by using the first node information and the power generation information, it is determined that an overvoltage has occurred in the first node N1 or it is predicted that an overvoltage will occur in the first node N1, a jth (j is a natural number less than N) distributed controller may attempt to control a jth distributed resource in a direction in which the overvoltage of the first node N1 is resolved.

When receiving the first node information and the power generation information, the N number of distributed devices may determine whether an overvoltage has occurred in the first node N1 or may predict the occurrence of an overvoltage at the first node N1. In another aspect, after receiving the first node information and the power generation information, the N number of distributed devices may determine whether an overvoltage has occurred in the first node N1 or may predict the occurrence of an overvoltage at the first node N1.

When it is determined that an overvoltage has occurred in the first node N1 or it is predicted that an overvoltage will occur in the first node N1, each distributed device may attempt to control the distributed resource included in each distributed device, and when a control limit of each distributed resource is reached, each distributed device may transmit the first node information and the power generation information to a subsequent distributed device. In another aspect, each distributed device may attempt to resolve the overvoltage of the first node N1 by using the distributed resource thereof, and when a control limit is reached, may request a subsequent distributed device to resolve the overvoltage of the first node N1.

When a last distributed device, that is, the Nth distributed device, reaches a control limit, the Nth distributed device may transmit a signal to the power generation device 110, and the power generation device 110 may perform limiting of a power generation amount.

By the control flow according to the embodiment, the first distributed device 120 which is electrically closest to the power generation device 110 attempts to resolve the overvoltage of the first node N1, and when a control limit is reached, a next distributed device sequentially attempts to resolve the overvoltage of the first node N1. The overvoltage at the first node N1 may be controlled according to the balance between supply and demand of power and a location where the supply and demand occur. The control flow according to the embodiment may be regarded as a most appropriate control scheme in that the balance between supply and demand of power is attempted from a location closest to the first node N1.

Figure 2:
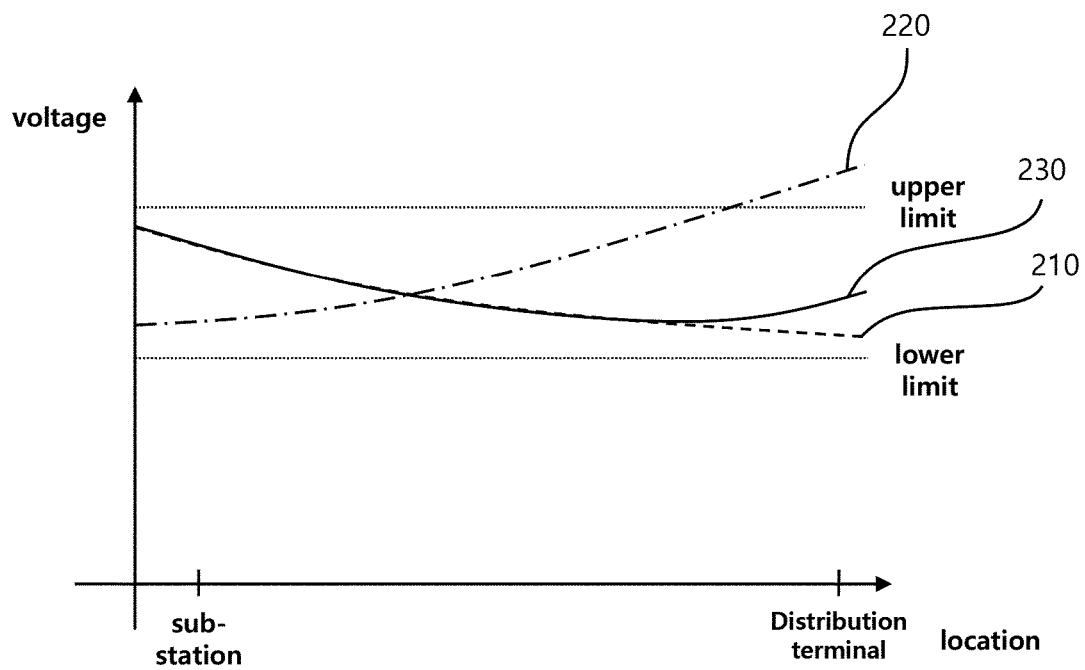
FIG. 2 is a diagram illustrating voltage distributions depending on a location in a distribution network.

FIG. 2 is a diagram illustrating voltage distributions depending on a location in a distribution network.

Referring to FIG. 2, in general, a voltage distribution in a distribution network may have a form in which a voltage level falls as a location is far from a substation and is closer to a distribution terminal as in a first curve 210. Such a curve form appears because a location becomes far from a power source as the location is far from the substation.

However, when a power generation device including a renewable energy power generation source is located near the distribution terminal, a voltage distribution in the distribution network may have a form in which the voltage level of the distribution terminal rises as in a second curve 220. Such a curve form appears because a new power source is added to the distribution terminal where there is not much load.

In the embodiment, in order to maintain a voltage distribution near the distribution terminal within a range between an upper limit voltage and a lower limit voltage, the voltage distribution of the distribution network may be made like a third curve 230 by controlling distributed devices located near the power generation device.

In order to make the voltage distribution of the distribution network like the third curve 230, it may be important to maintain balance between supply and demand of power near the newly added power source. To this end, in the embodiment, by controlling distributed devices in order in which an electrical distance from a node to which the power generation device is connected is short, a voltage at the distribution terminal may be lowered.

Figure 3:
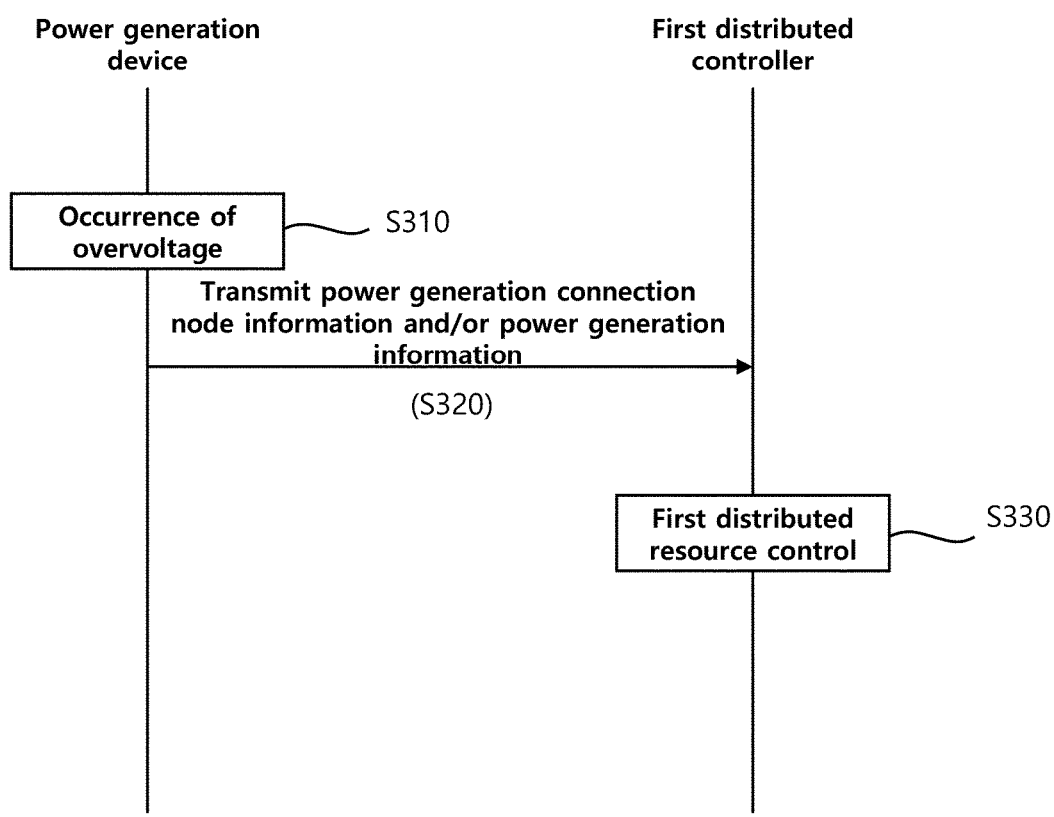
FIG. 3 is a flowchart of a first distribution network management method in accordance with an embodiment.

FIG. 3 is a flowchart of a first distribution network management method in accordance with an embodiment.

Referring to FIG. 3, a power generation device may determine whether an overvoltage has occurred in a node to which the power generation device is connected (hereinafter, referred to as a 'power generation connection node') (S310).

The power generation device may transmit power generation connection node information and/or power generation information to a first distributed controller (S320). The power generation connection node information may include information on the voltage of the power generation connection node and/or information on whether an overvoltage of the corresponding node has occurred. The power generation information may include information on the power generation amount of the power generation device.

The first distributed controller may receive the power generation connection node information and/or the power generation information, and may resolve the overvoltage of the power generation connection node by controlling a first distributed resource (S330).

By using the power generation connection node information and/or the power generation information, the first distributed controller may determine whether the overvoltage of the power generation connection node is caused by the power generation device. Only when it is determined that the corresponding overvoltage is caused by the power generation device, the step S330 may be performed.

When the response speed of the first distributed resource is slow, that is, when the reaction time of the first distributed resource is long, the first distributed controller may predict in advance an overvoltage in the power generation connection node, and may previously control in advance the first distributed resource.

Figure 4:
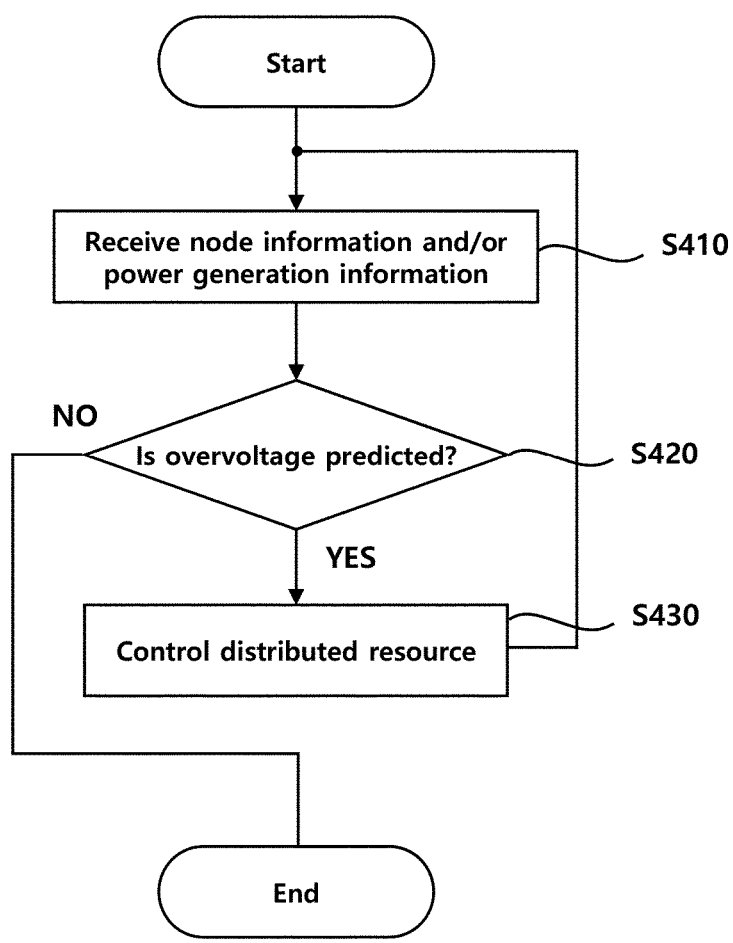
FIG. 4 is a flowchart of a second distribution network management method in accordance with an embodiment.

FIG. 4 is a flowchart of a second distribution network management method in accordance with an embodiment.

Referring to FIG. 4, a distributed device may receive power generation connection node information and/or power generation information (S410). A first distributed device close to a power generation device may receive the power generation connection node information and/or the power generation information directly from the power generation device. Another distributed device may receive the power generation connection node information and/or the power generation information from a previous distributed device.

The distributed device may predict an overvoltage at a power generation connection node by using the power generation connection node information and/or the power generation information (S420). When an overvoltage is predicted within a predetermined time (YES of S420), the distributed device may control a distributed resource (S430). The response time of the distributed resource to a control command of a distributed controller may be shorter than the predetermined time.

The distributed device may transfer a voltage control command to the distributed resource. In response to the voltage control command, the distributed resource may perform control to maintain the voltage of a node to which it is connected, within a predetermined range.

The voltage control command may be executed sequentially from a distributed device close to the power generation device.

Figure 5:
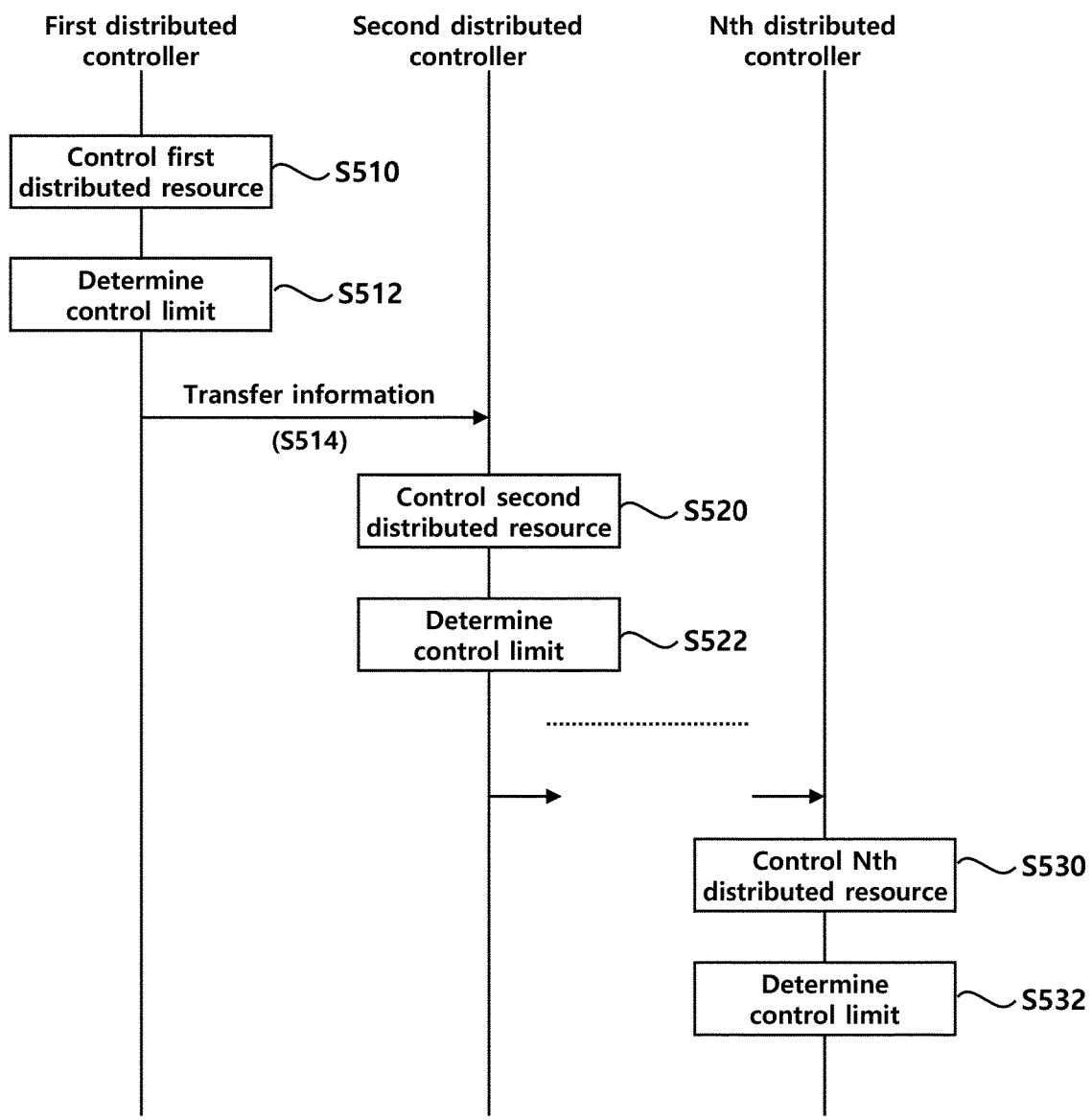
FIG. 5 is a flowchart of a third distribution network management method in accordance with an embodiment.

FIG. 5 is a flowchart of a third distribution network management method in accordance with an embodiment.

Referring to FIG. 5, when power generation connection node information and/or power generation information is received, first, a first distributed controller may perform voltage control for a second node, by controlling a first distributed resource (S510).

When the voltage control is performed, the first distributed resource may attempt to consume power to a range close to the power generation amount of a power generation device. When another power source is further involved, the first distributed resource may succeed in voltage control only when consuming more power than the power generation amount of the power generation device. When there is no another power source and a separate load exists, the first distributed resource may perform voltage control while consuming less power than the power generation amount of the power generation device.

The first distributed resource may have a predetermined limit in power consumption amount. For example, when the first distributed resource is an ESS, there may be a predetermined limit in charge/discharge power, and there may be a predetermined limit in the amount of charge/discharge power according to a state-of-charge (SOC). The first distributed controller may determine a control limit for the first distributed resource (S512).

When the control limit is checked, the first distributed controller may transmit the power generation connection node information and/or the power generation information to a second distributed controller (S514).

When the power generation connection node information and/or the power generation information is received, the second distributed controller may perform voltage control for a third node, by controlling a second distributed resource (S520).

The second distributed resource may also have a predetermined limit in power consumption amount. The second distributed controller may determine a control limit for the second distributed resource (S522).

When the control limit is checked, the second distributed controller may transmit the power generation connection node information and/or the power generation information to a subsequent distributed controller. In the same way, as a distributed controller which has reached a control limit transmits the power generation connection node information and/or the power generation information to a subsequent distributed controller, the power generation connection node information and/or the power generation information may be transferred to an Nth distributed controller.

When the power generation connection node information and/or the power generation information is received, the Nth distributed controller may perform voltage control for an (N+1)th node, by controlling an Nth distributed resource (S530).

The Nth distributed controller may determine a control limit for the Nth distributed resource (S532), and when it is determined that the control limit is reached, the Nth distributed controller may transmit, to the power generation device, a signal which requests the power generation device to limit a power generation amount.

Voltage control levels in respective distributed devices, that is, levels of predetermined voltages in voltage control, may be different from one another. For example, a voltage control level of the first distributed resource may be lowest, and a voltage control level of the Nth distributed resource may be highest.

The farther away from the power generation device, the higher the possibility of intervention of another resource is, and the closer to a substation, the more the influence of a grid increases, which makes it difficult to raise a voltage control level.

Meanwhile, a distributed resource may be a general load, an ESS or an electric vehicle charging station. In the case of the electric vehicle charging station, it is possible to control a power consumption amount through adjustment of charging scheduling.

The Nth distributed device may transmit directly to the power generation device a signal which requests limiting of a power generation amount, and in another method, may transmit a signal which requests limiting of a power generation amount, to a previous distributed device which has transmitted the information to the Nth distributed device. Then, the signal may be transmitted to the power generation device in a relay method in which the previous distributed device transfers again the signal to a distributed device before the previous distributed device.

When an overvoltage is resolved, each distributed device may stop controlling a distributed resource, and may transmit a control enable signal to a previous distributed device. By this method, control may be naturally ended from a distributed device which is generally far from the power generation device.

When an overvoltage is resolved, the Nth distributed device may stop by itself controlling the distributed resource, and may transmit a control enable signal to the previous distributed device. When the control enable signal is received, the other distributed devices may stop controlling distributed resources, and may transmit the control enable signal to previous distributed devices, by which the control of all the distributed devices may be stopped.

As is apparent from the above description, according to the embodiments, it is possible to resolve the overvoltage state of a distribution terminal by a power generation device including a renewable energy source. Further, according to the embodiments, it is possible to maintain the power quality of the distribution terminal without limiting the power generation amount of the power generation device including the renewable energy source. Also, according to the embodiments, it is possible to autonomously maintain power quality at the distribution terminal through distributed control rather than central control.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although a preferred embodiment of the present disclosure has been described for illustrative purposes, those skilled in the art will appreciate that various modifications, additions and substitutions are possible, without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A distribution network management system comprising:
    a power generation device including a renewable energy power generation source and connected to a distribution network through a first node; and
    N distributed devices including a first distributed device and a second distributed device, where N is a natural number equal to or greater than 2,
    wherein the first distributed device includes a first distributed resource, is connected to the distribution network through a second node, and is configured to receive first node information and power generation information from the power generation device and attempt to control the first distributed resource in a direction in which an overvoltage for the first node is resolved,
    wherein the second distributed device includes a second distributed resource, is connected to the distribution network through a third node which is located farther away from the first node than the second node, and is configured to, when the first node information and the power generation information are received from the first distributed device, attempt to control the second distributed resource in a direction in which the overvoltage for the first node is resolved,
    wherein, when arranging the N distributed devices in an ascending order of distances to the first node based on connection locations to the distribution network, in a case of not being the first distributed device closest to the first node or a last distributed device farthest from the first node, each distributed device communicates only with distributed devices right before and right after each distributed device, and
    wherein, when an ith distributed device fails to resolve the overvoltage for the first node, the ith distributed device transmits the first node information and the power generation information to an (i+1)th distributed device, where i is a natural number.

2. The distribution network management system according to claim 1, wherein the first distributed device determines, through the first node information, whether an overvoltage has occurred at the first node, and when it is determined through the power generation information that the overvoltage is caused by the power generation device, attempts to control the first distributed resource in a direction in which the overvoltage for the first node is resolved.

3. The distribution network management system according to claim 1, wherein, when it is predicted through the first node information and the power generation information that the overvoltage will occur at the first node within a predetermined time, the first distributed device attempts to control the first distributed resource in a direction in which the overvoltage for the first node is resolved.

4. The distribution network management system according to claim 3, wherein a reaction time of the first distributed resource for a control command of the first distributed device is shorter than the predetermined time.

5. The distribution network management system according to claim 1, wherein the first distributed device transfers, to the first distributed resource, a voltage control command for the second node.

6. The distribution network management system according to claim 1, wherein the renewable energy power generation source is a solar power generation source,
   wherein the first distributed resource is an energy storage system (ESS) resource, and
   wherein the second distributed resource is a load resource.

7. The distribution network management system according to claim 1, wherein, when the last distributed device fails to resolve the overvoltage for the first node, the last distributed device requests the power generation device to limit a power generation amount.

* * * * *